US011327886B2

(12) United States Patent
Huang

(10) Patent No.: US 11,327,886 B2
(45) Date of Patent: May 10, 2022

(54) CAPTURING TIME-VARYING STORAGE OF DATA IN MEMORY DEVICE FOR DATA RECOVERY PURPOSES

(71) Applicant: Board of Trustees of the University of Illinois, Urbana, IL (US)

(72) Inventor: Jian Huang, Champaign, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 46 days.

(21) Appl. No.: 16/946,873

(22) Filed: Jul. 9, 2020

(65) Prior Publication Data

US 2021/0011845 A1   Jan. 14, 2021

Related U.S. Application Data

(60) Provisional application No. 62/872,538, filed on Jul. 10, 2019.

(51) Int. Cl.
*G06F 12/00* (2006.01)
*G06F 12/02* (2006.01)
*G06F 12/1009* (2016.01)

(52) U.S. Cl.
CPC ...... *G06F 12/0253* (2013.01); *G06F 12/1009* (2013.01); *G06F 2212/1044* (2013.01)

(58) Field of Classification Search
CPC ............. G06F 12/0253; G06F 12/1009; G06F 2212/1044
See application file for complete search history.

(56) References Cited

U.S. PATENT DOCUMENTS

| 6,732,125 | B1 | 5/2004 | Autrey et al. |
| 8,130,554 | B1 | 3/2012 | Linnell |
| 9,442,975 | B2 | 9/2016 | Weber et al. |
| 2011/0271037 | A1* | 11/2011 | Oh .................. G06F 3/0679 711/103 |
| 2013/0283381 | A1 | 10/2013 | Thadikaran et al. |
| 2016/0063252 | A1 | 3/2016 | Spernow et al. |
| 2016/0299715 | A1* | 10/2016 | Hashimoto ........... G06F 3/0652 |

(Continued)

FOREIGN PATENT DOCUMENTS

CN  102147767 A  8/2011

OTHER PUBLICATIONS

"IOzone Filesystem Benchmark," www.iozone.org, retrieved on Jul. 22, 2020, 4 pages.

(Continued)

*Primary Examiner* — Shawn X Gu
(74) *Attorney, Agent, or Firm* — Lowenstein Sandler LLP

(57) ABSTRACT

A memory device (or memory sub-system) includes one or more memory components having multiple blocks, the multiple blocks containing pages of data. A processing device is coupled to the one or more memory components. The processing device to execute firmware to: track write timestamps of the pages of data that have been marked as invalid; retain a storage state stored for each page marked as invalid, wherein invalid data of the marked pages remains accessible via the storage states; in response to a write timestamp of a page being beyond a retention time window, mark the page as expired, indicating that the page is an expired page; and reclaim the expired page for storage of new data during a garbage collection operation.

29 Claims, 8 Drawing Sheets

(56) References Cited

U.S. PATENT DOCUMENTS

| | | | |
|---|---|---|---|
| 2018/0074951 A1 | 3/2018 | Feigin et al. | |
| 2019/0370247 A1* | 12/2019 | Eluri | G06F 16/908 |
| 2020/0133843 A1* | 4/2020 | Muchherla | G06F 12/0253 |

OTHER PUBLICATIONS

Abulila, Ahmed et al., "FlatFlash: Exploiting the Byte-Accessibility of SSDs within A Unified Memory-Storage Hierarchy," In Proceedings of the 24th ACM International Conference on Architectural Support for Programming Languages and Operating Systems (ASPLOS'19). Providence, RI.

Agrawal, N. et al., "Design Tradeoffs for SSD Performance," USENIX '08: 2008 USENIX Annual Technical Conference pp. 57-70.

Alagappan, R. et al., "Correlated crash vulnerabilities," In Proceedings of the 12th USENIX Conference on Operating Systems Design and Implementation (OSDI'16), 2016.

Baek, S. et al., "SSD-Insider: Internal Defense of Solid-State Drive against Ransomware with Perfect Data Recovery," In Proceedings of 2018 IEEE 38th International Conference on Distributed Computing Systems (ICDCS'18). Vienna, Austria.

Bux, W. et al., "Performance of Greedy Garbage Collection in Flash-Based Solid-State Drives," Performace Evaluation, vol. 26, Issue 11, Nov. 2010, pp. 1172-1186.

Chervenak, Ann et al., "Protecting file systems: A survey of backup techniques," In Proceedings of Joint NASA and IEEE Mass Storage Conference Conference, 1998.

Choi, Hyun Jin, et al., "A Flash Translation Layer Based on a Journal Remapping for Flash Memory," ACM Transaction on Storage 4, 4 (Feb. 2009), 14:1-14:22.

Costan, Victor, et al., "Sanctum: Minimal Hardware Extensions for Strong Software Isolation," In Proceedings of 25th USENIX Security Symposium (USENIX Security'16) Austin, TX.

Devecsery, David, et al., "Eidetic Systems," In Proceedings of the 11th USENIX Conference on Operating Systems Design and Implementation, Broomfield, CO. (OSDI 2014).

Dropbox Business, "Everything You Need for Work, All in One Place," https://dropbox.com/?landing=dbv2, received on Jul. 22, 2020, 11 pages.

EPFL Official Shore-MT Page, https://sites.google.com/view/shore-mt/, retrived on Jul. 22, 2020, 3 pages.

Extundelete: An ext3 and ext4 file undeletion utility, extundelete.sourceforge.net, retrieved on Jul. 22, 2020, 5 pages.

Fryer, D. et al., "Checking the integrity of transactional mechanisms," In Proceedings of the 12th USENIX Conference on File and Storage Technologies (FAST'14), 2014.

Gatla, O.R. et al., "Towards robust file system checkers," In Proceedings of the 16th USENIX Conference on File and Storage Technologies (FAST'18), 2018.

GitHub—tytso/e2fsprogs: Et2/3/4 file system utilites, https://github.com/tytso/e2fsprogs, retrieved on Jul. 22, 2020, 2 pages.

Gupta, Aayush et al., "DFTL: a flash translation layer employing demand-based selective caching of page-level address mappings," In Proceedings of the 14th International Conference on Architectural Support for Programming Languages and Operating System (ASPLOS'09), Washington, DC. 2009.

Harris, R., "Arriving at an Anti-forensics Consensus: Examining How to Define and Control the Antiforensics Problem," Digital Investigation 35, pp. S44-S49 (2006).

Harris, Ryan, "Arriving at an Anti-forensics Consensus: Examining How to Define and Control the Anti-forensics Problem," In Proceedings of the Digital Forensic Research Conference (DFRWS'06), Lafayette, IN., Technical Report 2006.

Huang, J. et al., "Pallas: Semantic-aware checking for finding deep bugs in fast path," In Proceedings of the 22nd International Conference on Architectural Support for Programming Languages and Operating Systems (ASPLOS'17), 2017.

Huang, Jian, et al., "FlashBlox: Achieving Both Performance Isolation and Uniform Lifetime for Virtualized SSDs," In Proceedings of the 15th USENIX Conference on File and Storage Technologies (FAST'17) Santa Clara, CA.

Huang, Jian, et al., "FlashGuard: Leveraging Intrinsic Flash Properties to Defend Against Encryption Ransomware," In Proceedings of the ACM SIGSAC Conference on Computer and Communications Security (CCS'17) (CCS'17), Dallas, TX, 2017.

Huang, Jian, et al., "Unified Address Translation for Memory-mapped SSDs with FlashMap," In Proceedings of the 42nd Annual International Symposium on Computer Architecture (ISCA '15), Portland, OR (2015).

Huang, Ping, et al., "BVSSD Built-in Versioning Flash-Based Solid State Drives," In Proceeding of 5th Annual International Systems and Storage Conference (SYSTOR '12), Haifa, Israel (2012).

Katcher, Jeffrey, "PostMark: A New File System Benchmark," http://www.netapp.com/technology/level3/3022.html, 8 pages, copyright 1997, Network Applicance, Inc.

Kavalanekar, Swaroop, et al., "Characterization of storage workload traces from production Windows Servers," In Proceedings of IEEE International Symposium on Workload Characterization (IISWC'08), 2018, pp. 119-128.

Kharaz, Amin, et al., "UNVEIL: A Large-Scale, Automated Approach to Detecting Ransomware," In 25th USENIX Security Symposium (USENIX Security 16). Austin, TX, pp. 757-772.

King, C. et al. "Empirical Analysis of Solid State Data Retention when used with Contemporary Operating Systems," Digital Investigation, vol. 8, Supplement, Aug. 2011, pp. S111-S117.

Lechmann, Marc, "LibLZF," oldhome.schmorp.de/marc/liblzf.htmp, 7 pages, last change, Aug. 25, 2008.

Lee, Changman, et al., "F2FS: A New File System for Flash Storage," In Proceedings of 13th USENIX Conference on File and Storage Technologies (FAST '15), Santa Clara, CA (2015).

Lee, Jaheung, et al., "An Efficient Secure Deletion Scheme for Flash File Systems," Journal of Information Science and Engineering 26(1), 2010.

Lee, Sungjin, et al, "Improving Performance and Capacity of Flash Storage Devices by Exploiting Heterogeneity of MLC Flash Memory," IEEE Transactions on Computers, 63, 10, pp. 2445-2458 (2014).

Li, Z. et al., "Cp-miner: A tool for finding copy-paste and related bugs in operating system code," In Proceedings of the 6th USENIX Conference on Symposium on Operating Systems Design and Implementation (OSDI '04), 2004.

Lu, L. et al., "A study of linux file system evolution," In Presented as part of the 11th USENIX Conference on File and Storage Technologies (FAST'13), San Jose, CA, 2013.

Lucas-Mearian, "SSD Prices Plummet Again, Close in on HDDs," 1 page, Mar. 3, 2016.

Ma, A. et al., "The fast file system checker," In Proceedings of the 11th USENIX Conference on File and Storage Technologies (FAST '13), 2013.

Morrey, C.B. et al., "Peabody: the time traveling disk," In Proceedings of the 20th IEEE/11th NASA Goddard Conference on Mass Storage Systems and Technologies, pp. 241-253 (MSST '03), 2003.

Muniswamy-Reddy, Kiran-Kumar, et al., "A Versatile and User-oriented Versioning File System," In Proceedings of the 3rd USENIX Conference on File and Storage Technologies (FAST'04), San Francisco, CA (2004).

Peterson, Zachary et al., "Ext3Cow: A Time-shifting File System for Regulatory Compliance," ACM Transaction on Storage 1(2), pp. 190-212, May 2005.

Pillai, T.S., et al., "All file systems are not created equal: On the complexity of crafting crash-consistent applications," In Proceedings of the 11th USENIX Conference on Operating Systems Design and Implementation (OSDI'14), 2014.

Prabhakaran, Vijayan et al., "Analysis and Evolution of Journaling File Systems," In USENIX Annual Technical Conference (Usenix ATC '05), Anaheim, CA, 2005.

Prabhakaran, Vijayan, et al., "Transactional Flash," In Proceedings of the 8th USENIX Conference on Operating Systems Design and Implementation (OSDI '08), San Diego, CA, 2008.

Raghavan, S. "Digital forensic research: current state of the art," CSI Transactions on ICT (2013).

(56) References Cited

OTHER PUBLICATIONS

Ren, J., et al., "I-CASH: Intelligently Coupled Array of SSD and HDD," In Proceedings of the 2011 IEEE 17th International Symposium on High Performance Computer Architecture (HPCA'11).
Samsung, "Samsung SSD 840 EVO Data Sheet," White Paper 2013.
Scaife, Nolen et al., "Cryptolock (and drop it): stopping ransomware attacks on user data," In Distributed Computing Systems (ICDCS), 2016 IEEE 36th International Conference on. IEEE, pp. 303-312, IEEE, 2016.
Shen, Kai Shen, et al., "Journaling of Journal Is (Almost) Free," In Proceedings of the 12th USENIX Conference on File and Storage Technologies (FAST '14), Santa Clara, CA, 2014.
Sigurbjarnarson, H. et al., "Push-button verification of file systems via crash refinement," In Proceedings of the 12th USENIX Symposium on Operating Systems Design and Implementation (OSDI '16), 2016.
SNIA—Storage Networking Industry Association: IOTTA Respsitory Home, iotta.snia.org/races/388m, 1 page, Copyright 2011.
Storage—PCPartPicker, http://pcpartpicker.com/trands/price/internal-hard-drive/, 10 pages, retrivied on Jul. 22, 2020.
Strunk, John D, et al., "Self-securing Storage: Protecting Data in Compromised System," In Proceedings of the 4th USENIX Conference on Symposium on Operating System Design & Implementation (OSDI '00), San Diego, CA (2000).
Subramanian, S. et al, "Snap- shots in a flash with ioSnap," In Proceedings of the European Conference on Computer Systems (EuroSys'14), Amsterdam, Netherlands, 2014.
The OpenSSD Project, Open-Souce Solid-State Drive Project for Research and Education, www.openssd.io, 4 pages, retrived on Jul. 22, 2020.
Virable, Michael, et al. "BlueSky: A Cloud-Backed File System for the Enterprise," In Proc. 10th USENIX conference on File and Storage Technologies (FAST '12), San Jose, CA (2012).
Wei, Michael Yung Chung, et al., "Reliably Erasing Data from Flash-Based Solid State Drives," In Proceedings of 9th USENIX Conference on File and Storage Technologies (FAST '11), San Jose, CA.
Wikipedia "Wannacry Ransomware Attack," https://en.wikipedia.org/wiki/WannaCry_ransomware_attack, retreived on Jul. 22, 2020, 19 pages.
Wu, Guanying, et al., "Delta-FTL: Improving SSD Lifetime via Exploiting Content Locality," In Proceedings of the 7th ACM European Conference on Computer Systems (EuroSys '12), Bern, Switzerland.
Xu, D. et al., "Cryptographic Function Detection in Obfuscated Binaries via Bitprecise Symbolic Loop Mapping," In Proc. 38th IEEE Symposium on Security and Privacy (Oakland' 17), San Jose, CA, May 2017.
Yang, J. et al., "Using model checking to find serious file system errors," In Proceedings of the 6th USENIX Conference on Operating Systems Design and Implementation (OSDI '04), pp. 273-287, 2004.
Yang, Jingpei, et al., "Don't Stack Your Log on My Log," In 2nd Workshop on Interactions of NVM/Flash with Operating Systems and Workloads (INFLOW '14), Broomfield, CO, 2014.
Yang, Qing, et al., "TRAP-Array: A Disk Array Architecture Providing Timely Recovery to Any Point-in-time," In Proceedings of the 33rd International Symposium on Computer Architecture (ISCA 06), pp. 289-301.

\* cited by examiner

Algorithm 1 GC procedure of TmrSSD

1: Check the block status table
2: if there is an expired delta block then
3:     Erase this delta block
4: else
5:     Select a victim data block
        ▷ the block with the most invalid pages
6:     Identify valid/invalid pages in the block page
        ▷ by checking the page validity table
7:     for each valid page do
8:         Migrate this page to a free page
9:         Update the address mapping entry
10:    for each invalid page do
11:        Check the page reclamation table
12:        if this page is reclaimable then
13:           Discard this page
        ▷ this page has been compressed or expired
14:        else
15:           Checking this page in the bloom filters
16:           if this page misses all the bloom filters then
17:              Discard this page
        ▷ this page has been expired
18:           else
19:              Read this page and its OOB metadata
20:              Read the older and unexpired data versions
        ▷ through the data pages chain
21:              Read the latest data version
22:              Compress these old data versions
        ▷ the latest version as reference
23:              Write back deltas to delta blocks with metadata
24:              Update the head of the delta pages chain
        ▷ in the index mapping table
25:              Mark compressed data pages as reclaimable
        ▷ in the page reclamation table
26:    Erase this data block

FIG. 7

CAPTURING TIME-VARYING STORAGE OF DATA IN MEMORY DEVICE FOR DATA RECOVERY PURPOSES

RELATED APPLICATIONS

This application claims the benefit under 35 U.S.C. § 119(e) of U.S. Provisional Patent Application No. 62/872,538, filed Jul. 10, 2019, which is incorporated herein by this reference in its entirety.

FEDERALLY SPONSORED RESEARCH OR DEVELOPMENT

This disclosure was made with government support under CNS-1850317 awarded by the National Science Foundation. The government has certain rights in the invention.

BACKGROUND

Preserving a history of storage states in a memory device, such as in a solid-state drive (SSD), can ensure system reliability and security. It facilitates system functions such as debugging, data recovery, and forensics. Existing software-based approaches for storage state preservation includes data journaling, logging, check-pointing, and saving backups of personal and system data. These existing software-based approaches not only introduce performance overhead and storage costs, but are also vulnerable to malware attacks. For example, attackers can obtain kernel privileges to terminate software detection tools or destroy storage state preservations that they create. One example of this is ransomware that uses kernel privileges to encrypt data, destroy data backups, and require users to pay a ransom to obtain a key by which the users can decrypt the data to access their files.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 7 is a flow chart of psuedocode for firmware execution of a garbage collection operation by the memory controller according to an embodiment.

DETAILED DESCRIPTION

Figure 1A:
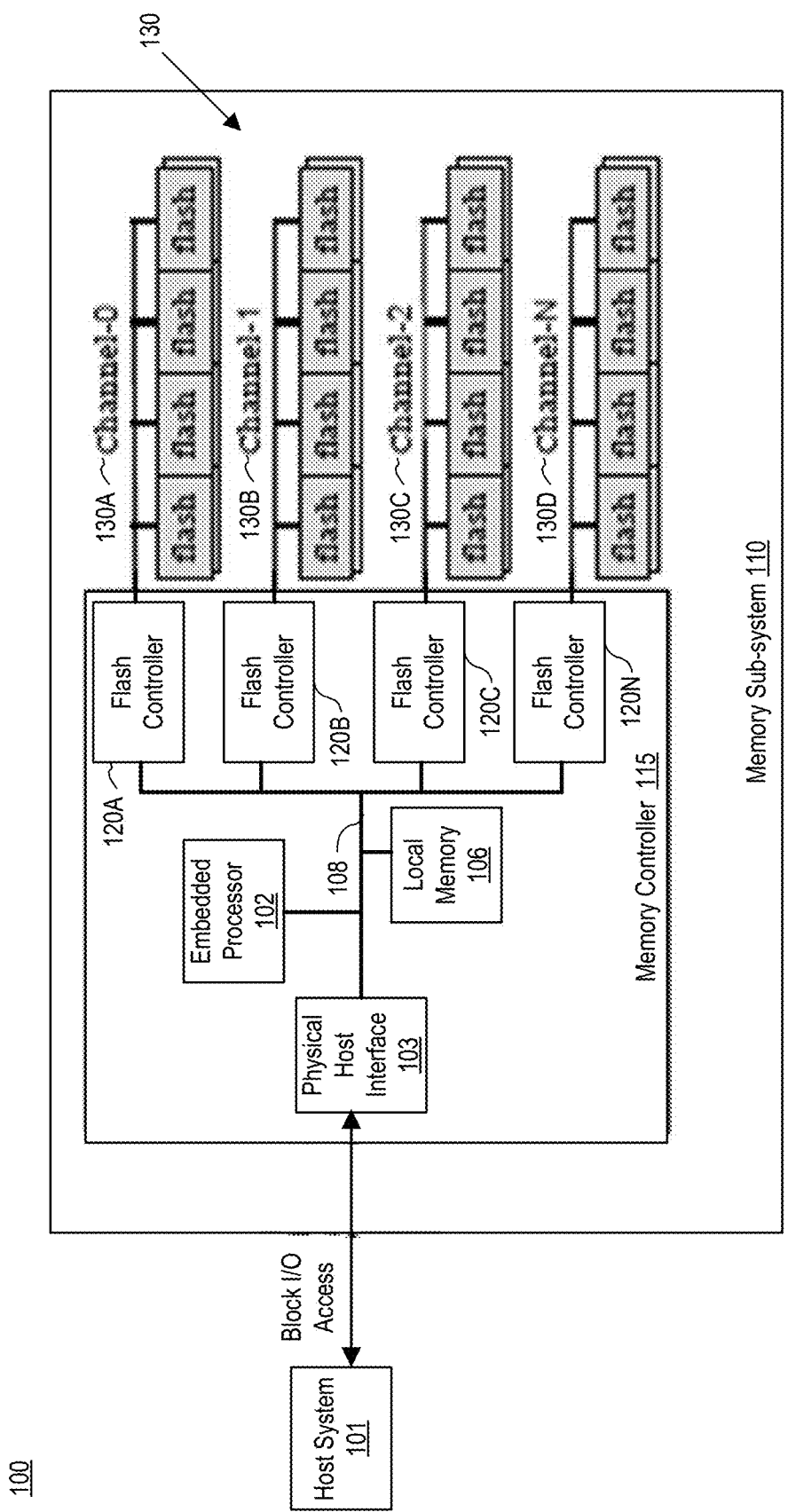
FIG. 1A is a block diagram of an example computing environment that includes a memory sub-system according to one embodiment.

By way of introduction, the present disclosure describes a system, firmware, and number of methods that overcome the deficiencies in the prior software-based solutions or techniques discussed above. The disclosed system is based on a memory sub-system, such as an SSD, that transparently retains storage states in flash-based memory components (e.g., keep them stored), and maintains a lineage of those storage states for purposes of rolling back to data stored at a previous time. A storage state refers to stored data that includes a status (e.g., valid, invalid, expired, or the like) and a corresponding time stamp that allows chronological tracking of when different data versions were programmed (or written) to the memory components. The memory sub-system enables developers to retrieve the storage state from such a previous time, creating a time-varying property within the storage states. A software interface can also support storage-state query and rollback, for developers to exploit firmware-isolated, time-varying properties of the storage states.

While different types of memory sub-systems are envisioned, a flash-based SSD can be a natural candidate for at least four reasons. First, flash pages are not written without being erased, so modern SSDs (or similar memory devices) perform out-of-place write updates to reduce the overhead generated by expensive erase operations. The out-of-place write update routine inherently supports logging functionality since old versions of data are not immediately erased. Second, the SSD has to run a garbage collection (GC) operation to reclaim obsolete (e.g., invalid) data for free space. With some modification to an existing GC algorithm, the disclosed memory sub-system can reclaim older versions of storage state in time order. Therefore, the memory sub-system can maintain the lineage of storage states in an SSD by keeping track of older versions of data. Third, the firmware of the memory sub-system is isolated from the operating system (OS) and upper-layer software. The isolated firmware has a much smaller Trusted Computing Base (TCB) than upper-level systems software, which is less vulnerable to malware attacks. It provides a last line of defense for protecting user data, even if the host OS is compromised. Lastly, SSDs have become prevalent in a vast majority of storage systems driven by their significantly increased performance and decreased cost.

In various embodiments, the disclosed memory sub-system is a lightweight firmware-level solution that can fulfill the time-varying property of buffering storage states over time. The disclosed firmware-level solution balances the tradeoff between the retention time of past storage states and the storage performance by estimating the GC overhead. This firmware-level solution can dynamically adjust retention duration according to application workload patterns, while still enforcing a guarantee of a lower bound on the retention duration (e.g., three days by default, although other similar minimum retention durations are envisioned, such as two days, four days, or the like). To further retain past storage states for a longer time, the memory sub-system can compress the storage state during idle input/output (I/O) cycles. The disclosed study experiments with a variety of storage workloads, collected from both university and enterprise computers, which demonstrate that memory sub-system can retain storage states for up to eight weeks, with minimal performance overhead.

To facilitate the retrieval of storage states, the memory sub-system leverages the available hardware resources in commodity memory sub-systems (e.g., SSDs and the like), such as the out-of-band (OOB) metadata stored with each flash page to store the reverse mapping from physical page address in flash chip to logical page address in the file (or host) system. The OOB metadata describes additional memory capacity built into each page already in conventional devices to store upper level application sematic information and other status descriptors. The firmware uses back-pointers to connect the physical flash pages that map to the same logical page, which enables the memory sub-system to maintain the lineage of storage states in hardware. The disclosed OOB metadata operations are performed in firmware, and thus are also firmware-isolated from upper-level, or host software. To accelerate retrieving storage states, the memory sub-system can utilize the internal parallelism of memory sub-systems to parallelize queries among multiple flash chips.

Based on this time-travel property, a software interface tool is described that can interface with the firmware of the memory controller and answer storage state queries in both backward (e.g., the storage state a few hours ago) and forward manner, e.g., how has a file been changed since some prior state or time-based reference point. These basic functionalities enable features, such as protecting user data against encryption ransomware, recovering user files, retrieving update logs, and providing an evidence chain for forensics.

In one embodiment, the memory sub-system includes one or more memory components having multiple blocks that contain pages of data, and a memory controller (e.g., processing device) coupled to the one or more memory components. The processing device is to execute firmware to track timestamps of the pages of data that have been marked as invalid, and retain a storage state for each page marked as invalid. The invalid data of the marked pages thus remains accessible via the storage states. In response to a timestamp of a page being beyond a predetermined time window, the processing device is to mark the page as expired, which indicates that the page is an expired page. The processing device can then reclaim the expired page for storage of new data during a garbage collection operation.

In related embodiments, metadata associated with each page, identified by a physical page address (PPA), includes a logical page address (LPA) mapped to the PPA. The metadata may also include a back-pointer containing a previous PPA to which the LPA was previously mapped, where the back-pointer is useable to construct a reverse mapping chain between different data versions for an identical LPA. The metadata may also include the timestamp of the PPA, which is to identify different data version of an identical LPA. Before reclaiming the expired page and in response to a request to restore the page (e.g., to perform a restore operation to recover the page), the processing device can further execute the firmware to access the metadata of the page to determine the PPA of the page at a time for which the invalid data is to be restored. The processing device can then further write the invalid data of the page to a free block of the one or more memory components, to restore the data associated with a previous storage state, e.g., stored at a previous PPA of the LPA.

In embodiments, the memory sub-system utilizes firmware-level time-varying properties to achieve the same goals as conventional software-based solutions, in a transparent and secure manner, with low performance overhead. Overall, the work that inspires this disclosure make at least the following contributions. First, an updated memory sub-system retains past storage states and their lineage in hardware, in time order, without relying on software techniques. Second, a software interface is executable by a host system and adapted to exploit the firmware-isolated time-travel properties of the memory sub-system. The software interface supports rich storage-state queries and data rollback, for example. Third, the memory sub-system quantifies the tradeoff between retention duration of storage states versus storage performance. The disclosure proposes an adaptive mechanism to reduce performance overhead while retaining past storage states to a bounded window of time.

For purposes of experimentation, an implementation of the memory sub-system is made in a programmable SSD. The software interface is developed for a few popular system functions, such as data recovery and log retrieval of file updates. The firmware within the memory sub-system is run against a set of storage benchmarks and traces collected from different computing platforms. Experimental results demonstrate that the memory sub-system retains the history of storage states for up to eight weeks. The memory sub-system fulfills these functions with up to 12% performance overhead. The software interface is also to apply the memory sub-system to several real-world use cases, and use one or more application programming interfaces (APIs) to retrieve past storage states or conduct data rollback. The performance results also show that this software interface can accomplish the storage-state queries and data rollback without delay typically associated with software. These and other advantages will be apparent in the description of the following figures, and thus the technical advantages are not limited to those described here.

FIG. 1A is a block diagram of an example computing environment 100 that includes a memory sub-system 110 according to one embodiment. The memory sub-system 110 can include a memory controller 115 (e.g., processing device) and a number of memory components 130, e.g., a defining a number of storage channels including a first channel 130A, a second channel 130B, a third channel 130C, and an Nth channel 130D. The memory components 130 can be volatile memory components, non-volatile memory components, or a combination of such. The memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, and a Universal Flash Storage (UFS) drive. Examples of memory modules include a dual in-line memory module (DIMM), a small outline DIMM (SO-DIMM), and a non-volatile dual in-line memory module (NVDIMM).

The computing environment 100 can include a host system 101 that is coupled to one or more memory sub-systems 110. In some embodiments, the host system 120 is coupled to different types of memory sub-system 110. FIG. 1A illustrates one example of a host system 101 coupled to one memory sub-system 110. The host system 101 uses the memory sub-system 110, for example, to write data to the memory sub-system 110 and read data from the memory sub-system 110. As used herein, "coupled to" generally refers to a connection between components, which can be an indirect communicative connection (e.g., via intervening components) or direct communicative connection (e.g., without intervening components), whether wired or wireless, including connections such as electrical, optical, magnetic, etc.

The host system 101 can be a computing device such as a desktop computer, laptop computer, network server, mobile device, or such computing device that includes a memory and a processing device. The host system 101 can include or be coupled to the memory sub-system 110 so that the host system 101 can read data from or write data to the memory sub-system 110. The host system 101 can be coupled to the memory sub-system 110 via a physical host interface 103.

Examples of the physical host interface 103 include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface 103 can be used to transmit data between the host system 101 and the memory sub-system 110. The host system 101 can further utilize an NVM Express (NVMe) interface to access the memory components 130 when the memory sub-system 110 is coupled with the host system 101 by the PCIe interface. The physical host interface 103 can provide an interface for passing control, address, data, and other signals between the memory sub-system 110 and the host system 101.

The memory components 130 can include any combination of the different types of non-volatile memory components and/or volatile memory components. As illustrated, an example of non-volatile memory components includes a negative- and (NAND) type flash memory. Each of the memory components 130 can include one or more arrays of memory cells (e.g., NAND memory cells) such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 101.

Although non-volatile memory components such as NAND type flash memory are described, the memory components 130 can be based on another type of memory such as a volatile memory so long as the other type of memory supports out-of-place updates and writes to memory pages. In some embodiments, the memory components 130 can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. Furthermore, the memory cells of the memory components 130 can be grouped as memory pages or data blocks that can refer to a unit of the memory component used to store data.

The memory system controller 115 (hereinafter referred to as "controller" or "processing device") can communicate with the memory components 130 to perform operations such as reading data, writing data, or erasing data at the memory components 130 and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include one or more embedded processor 102 configured to execute instructions (e.g., microcode) stored locally or in local memory 106, such as a random access memory (RAM) and which can also include some read-only memory (ROM). In one embodiment, the one or more embedded processor 102 is one or more processor core. In one embodiment, the local memory 106 is DRAM. The local memory 106 can be designed as a buffer, to store firmware and/or micro-code, as well as to store data structures involved with tracking metadata and storage states associated with mappings between LPAs and PPAs as will be discussed in more detail.

In the illustrated example, the local memory 106 of the controller 115 includes an embedded memory (e.g., firmware) configured to store instructions for performing various processes, operations, logic flows, and routines that control operation of the memory sub-system 110, including handling communications between the memory sub-system 110 and the host system 101. In some embodiments, the local memory 106 can include memory registers storing memory pointers, fetched data, etc. The local memory 106 can also include read-only memory (ROM) for storing micro-code. While the example memory sub-system 110 in FIG. 1A has been illustrated as including the controller 115, in another embodiment of the present disclosure, a memory sub-system 110 does not include the controller 115, and can instead rely upon external control (e.g., provided by an external host, or by a processor or controller separate from the memory sub-system).

In general, the controller 115 can receive commands or operations from the host system 101 and can convert the commands or operations into instructions or appropriate commands to achieve the desired access to the memory components 130. The controller 115 can be responsible for other operations such as wear leveling operations, garbage collection operations, error detection and error-correcting code (ECC) operations, encryption operations, caching operations, and address translations between a logical block address and a physical block address that are associated with the memory components 130. The controller 115 can further include host interface circuitry to communicate with the host system 101 via the physical host interface 103. The host interface circuitry can convert the commands received from the host system into command instructions to access the memory components 130 as well as convert responses associated with the memory components 130 into information for the host system 120.

In some embodiments, the memory sub-system 110 also includes a number of flash controllers 120A, 120B, 120C, . . . 120N corresponding to each storage channel 130A, 130B, 130C . . . 130N discussed earlier. Each flash controller can include address circuitry, e.g., a row decoder and column decoder (among other circuitry) that can receive an address from the controller 115 and decode the address to access the memory components 130, e.g., the memory components 130 associated with the destination storage channel. In this way, the use of separate flash controllers for respective storage channels supports higher levels of parallelism and improved system performance.

In embodiments, SSDs (understood to include other out-of-place-based memory drives) are widely used in various computing platforms as they provide orders-of-magnitude better performance than hard-disk drives (HDDs) with a price that is approaching that of HDDs. Rapidly shrinking process technology has also allowed us to boost SSD performance and capacity, accelerating their adoption in commodity systems.

An SSD has two major components, as shown in FIG. 1, a set of flash memory chips, and an SSD controller. As briefly discussed, each SSD has multiple storage channels, where each storage channel can independently receive and process read and write commands to flash chips of the memory components 130. Within each flash chip, there are multiple planes. Each plane is further divided into multiple flash blocks, each of which consists of multiple flash pages.

Due to the nature of flash memory, SSDs can read and write only at page granularity. Furthermore, a write can only occur to a free page. Once a free page is written, that page is no longer available for future writes until that page is first erased and its state reset to free. Unfortunately, the erase operations can be performed only at block granularity (where a block has multiple pages) and are time-consuming. Thus, a write operation is issued to a free page that has been erased in advance (e.g., out-of-place write), rather than issuing an expensive erase operation for every write. Because of out-of-place writes, an SSD employs indirections for maintaining the logical-to-physical address mapping. Out-of-place writes mean that each time a page is updated, the old version of the page is simply marked as invalid. And, garbage collection (GC) operations are performed later to reclaim it. The GC process, which performs the GC operations, runs once the number of free blocks is below a threshold in order to clean up invalid pages. The GC process can scan the SSD blocks, picking one candidate for cleaning. Then, the GC process can migrate any valid pages in the candidate block to a new free block, and when finished, erase the candidate block thereby freeing its pages for future writes. An SSD (and other out-of-place-based memory) inherently preserves past storage states, which can be exploited to implement the time-travel property within firmware.

Since each physical block has limited lifetime, modern SSDs also have wear-leveling support to prolong SSD lifetime by evenly distributing writes and erases to all blocks. To achieve wear-leveling, infrequently used blocks can be periodically moved so these blocks with low erase count can be used to reduce the stress of frequently erased blocks. The indirect mappings, wear-leveling, and GC operations can be managed by the Flash Translation Layer (FTL) or other translation layer in SSD firmware.

To handle the FTL, SSD controllers (like the controller 115) can be equipped with the one or more embedded processor 102 and the local memory 106, e.g., RAM. The embedded processor 102 can help with issuing I/O requests, translating logical addresses to physical addresses, and handling garbage collection and wear-leveling. To exploit the massive parallelism of flash chips, the one or more embedded processor 102 can have multiple cores. For instance, the MEX SSD controller used in Samsung® SSDs has a 3-core processor running at 400 MHz. The SSD controller has multiple channels and issues commands to perform I/O operations in different channels in parallel.

Durability of user data is a design concern in secure storage systems. To achieve this, storage systems have developed techniques such as journaling and data backups for decades. However, these techniques still suffer from malware attacks today. If malware manages to gain administrator privileges, it can execute kernel level attacks to destroy both local and remote data backups. Take the WannaCry encryption ransomware for example. The WannaCry encryption ransomware quickly infected hundreds of thousands of computers across 150 countries in less than a week after it was launched in May 2017. Encryption ransomware like WannaCry destructively encrypts user files. To defend against this, prior work has proposed several detection approaches. However, these approaches kick in only after some data has already been encrypted. Furthermore, ransomware can use kernel privileges to destroy backups. Therefore, software-based approaches lack sufficient protection.

Hence, the disclosed solutions turn to a hardware-assisted approach. The memory sub-system 110 provides firmware-level, time-varying properties by retaining the past storage state in the memory components 130. A storage state refers to stored data that includes a status (e.g., valid, invalid, expired, or the like) and a corresponding time stamp that allows chronological tracking of when different data versions were programmed (or written) to the memory components. Therefore, the memory sub-system 110 can recover user data, even after it has been encrypted or deleted by malware. The firmware-assisted approach adopted by the disclosed memory sub-system 110 has a number of advantages. For example, the approach makes the time-varying properties of the data storage firmware-isolated against malware exposure. Further, the approach has a much smaller TCB, compared to the OS kernel and other software-based approaches, and thus is less vulnerable to malware attacks.

A functionality of file systems is to recover the system and user data upon system crashes and failures. To achieve this, software-based tools like data journaling have been proposed. However, journaling introduces a significant performance over-head, due to the extra write traffic. As the memory sub-system 110 retains the history of both metadata (e.g., inode in file systems) and data for a window of time, the memory sub-system 110 allows developer to roll back a storage system to a previous state (at a specific time in the past) with minimal software involvement. Moreover, the memory sub-system 110 leverages the intrinsic out-of-place write mechanism in SSDs (or other out-of-place write devices) to retain past storage states, avoiding the redundant writes generated by the software-based journaling approach. The disclosed memory sub-system 110 transparently retains the lineage of the past storage states in SSDs. An inode (index node) is a data structure in a Unix-style file system that describes a file-system object such as a file or a directory. Each inode stores the attributes and disk block locations of the object's data.

Digital storage forensics have been widely used in both criminal law and private investigation, such as criminal identification and the detection of unauthorized data modification. Storage forensics need to reconstruct the original sequence of events that led to the incident. However, it is challenging to collect trusted evidence and to reconstruct the history of events. Due to insufficient evidence, incomplete recovery of events, or incomplete chronology of events, reconstruction of evidence may be incomplete or incorrect, which causes the failure of the investigation. To make matters worse, existing storage forensics have little capability to mitigate an anti-forensics malware with OS kernel privilege.

The disclosed memory sub-system 110, however, provides trustworthy evidence for storage forensics software tools, even if malicious users try to destroy the evidence in the victim computer. In contrast to forensics software that executes with the OS, the memory sub-system 110 leverages the time-varying properties in the hardware-isolated firmware, which facilitates the collection and reasoning of trusted evidence for storage forensics. Since the memory sub-system 110 is isolated from the OS, the evidence is tamper-proof from malicious users.

As discussed previously, malicious users could try to elevate their privilege to run as administrators and disable or destroy the software-based data backup solutions. It is not assumed the OS is trusted, but instead, the memory sub-system 110 trusts the flash-based SSD firmware. This seems to be a realistic threat model for at least two reasons. First, the SSD firmware is located within the memory controller 115 of the memory sub-system 110, underneath the generic block interface in computer systems. It is hardware-isolated from higher-level malicious processes. Second, SSD firmware has a much smaller TCB compared to the OS kernel, making it typically less vulnerable to malware attacks. Once the firmware is flashed into the SSD controller, commodity SSDs do not allow firmware modifications, which guarantees the integrity of the memory sub-system 110. In this work, we consider the situation where data on persistent storage is overwritten or deleted.

Once abnormal events are recognized (e.g., malicious attacks are detected) or users want to recover data, the users can use a software interface to conduct the data recovery procedure. However, malicious programs can try to exploit the data recovery procedure to attack the memory sub-system 110. For instance, a malicious user might roll back and erase all the data at a point, and then insert a large amount of junk data to trigger GC to erase the retained data copies. The memory sub-system 110 can defend against this attack. As the software interface rolls back data by writing them back like new updates, and the memory sub-system 110 retains the invalid data versions with a time window guarantee (three days by default), the memory sub-system 110 still retains the recent data versions in the memory components 130.

Figure 1B:
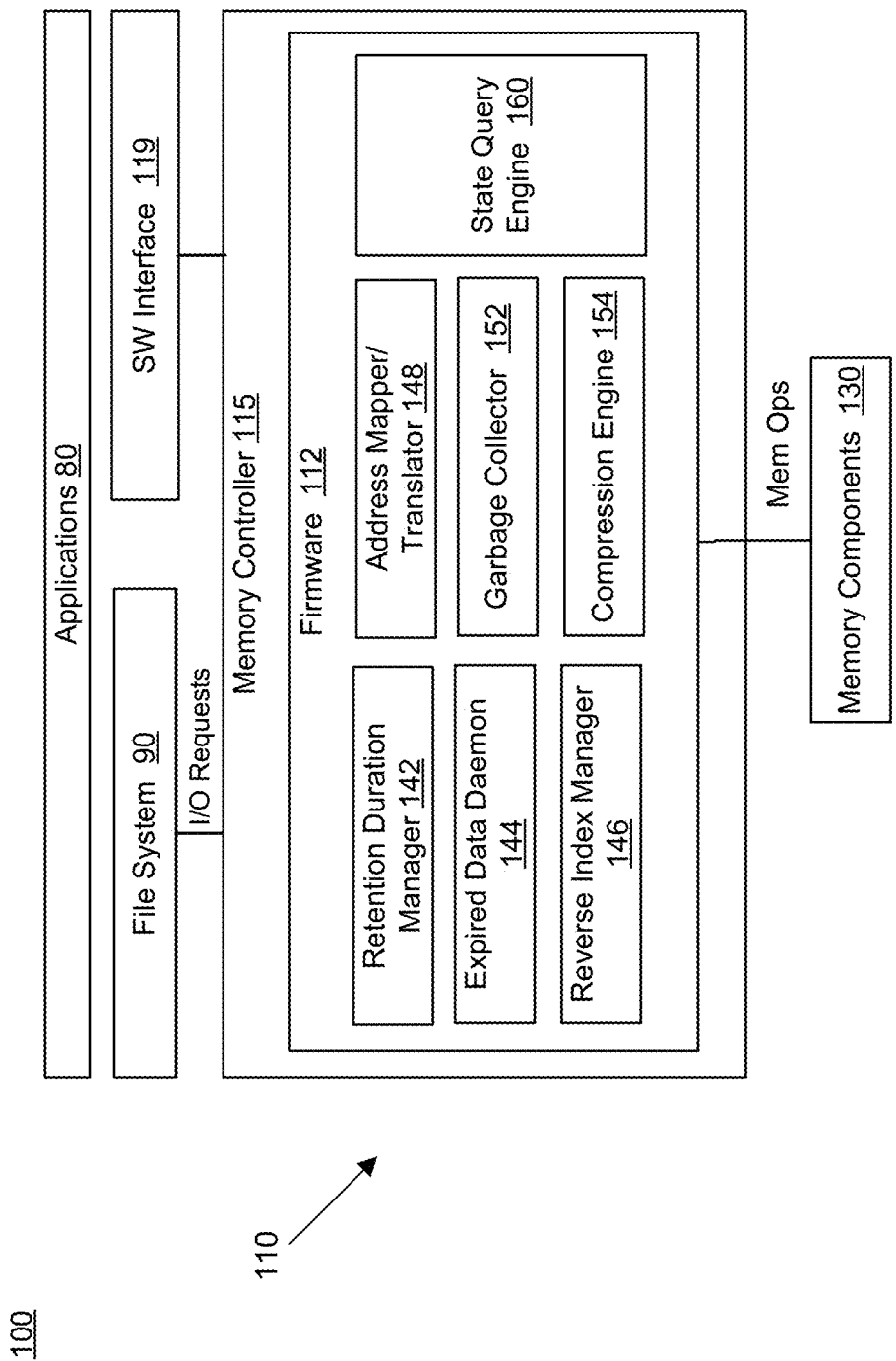
FIG. 1B is a block diagram of a memory controller and firmware of the memory sub-system of FIG. 1A, according to an embodiment.

FIG. 1B is a block diagram of the memory controller 115 and firmware of the memory sub-system 110 of FIG. 1A, according to an embodiment. The computing environment 100 can further include applications 80 (e.g., running on the host system 101), a file system 90 of the host system 101, and a software interface 119 that facilitates querying and interacting with the controller 115. The memory sub-system 110 leverages the intrinsic properties of flash SSDs to retain past storage states (or data versions) in the time order for future retrieval. The controller 115 can include or have access to firmware 112, which can include but not be limited to, a retention duration manager 142, an expired data daemon 144, a reverse index manager 146, an address mapper/translator 148, a garbage collector 152, a compression engine 154, and a state query engine 169. Memory operations to the memory components 130 may be facilitated via the functioning of the firmware 112, as executed by the one or more embedded processor.

In various embodiments, the retention duration manager 142 maintains a retention window in a workload-adaptive manner, whereas an expired data daemon 144 is used to identify invalid data versions (e.g., old pages) beyond this time window. Instead of reclaiming an invalid page immediately during GC, the controller 115 can reclaim the invalid page after the retention window has passed. An invalid state marker can be included within the OOB (or other) metadata of each page to indicate when a page is deleted or updated but should still be retained. To be able to retain storage states for a long time, the controller 115 compresses retained data using the compression engine 154. The reverse index manager 146 can maintain a reverse chronological mapping of invalid data versions, to enable fast past state query. The garbage collector 152 can be responsible both for cleaning expired data in order to recover free space, and for monitoring the GC overhead to provide feedback to the retention duration manager 142. The state query engine 160 can execute a variety of storage-state queries to exploit the time-varying properties, as will be explained.

Figure 2:
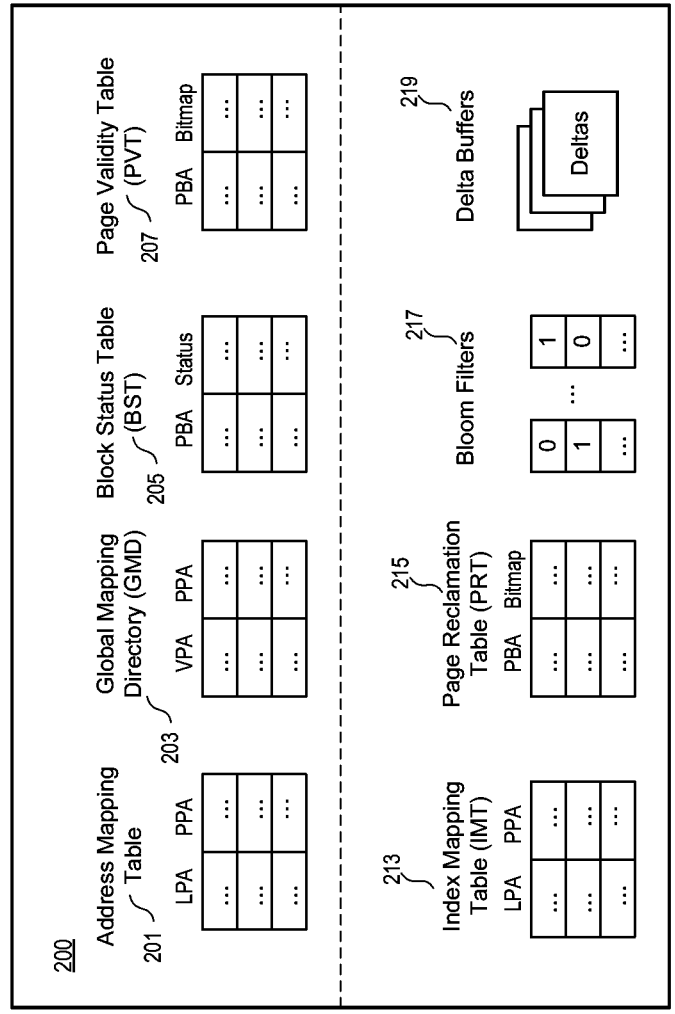
FIG. 2 is a block diagram of data structures, stored within the memory controller, which are useable to track storage states for pages in memory of the memory sub-system according to various embodiments.

To facilitate discussion in relation to FIG. 1B, the data structures of FIG. 2 are discussed. FIG. 2 is a block diagram of data structures 200, stored within the local memory 106, which are useable to track storage states for pages in memory of the memory device according to various embodiments. Existing tables for conventional memory sub-systems exist, which include an address mapping table (AMT) 201, a global mapping directory (GMD) 203, a block status table (BST) 205, and a page validity table (PVT) 207, although these tables may be updated to comply with added data structures. These additional data structures may include, but not be limited to, an index mapping table (IMT) 213, a page reclamation table (PRT) 215, multiple Bloom filters 217, and multiple Delta buffers 219 of the memory sub-system 110 (e.g., TimeSSD).

In one embodiment, the AMT 201 facilitates translation of the host logical page address (LPA) of an I/O request to a physical page address (PPA) that exists in a memory component (e.g., flash chip). Specifically, the AMT 201 contains a mapping for each LPA to its PPA on the memory components 130. To accelerate this address translation, recently-accessed mappings are cached, e.g., in the local memory 106 or other cache located on or off of the memory controller 115. The entire AMT 210 can be stored in the memory component as a set of translation pages, whose locations are recorded in the GMD 203. The BST 205 can maintain status information at block granularity, and the PVT 207 maintain status information at page granularity. The BST 205 may track, among other status information the number of invalid pages in each flash block, and the PVT 207 indicates whether a flash page is valid or not.

Since SSDs only support out-of-place update, an data update or delete causes the old version to be invalidated. Because writes (e.g., write operations) can only happen to erased blocks, the GC process is to clean up the invalid pages to make room for new write operations. For a regular SSD, the GC process can first use the BST 205 to select a candidate block (e.g., that with the lowest number of valid pages), and then check the PVT 207 to migrate valid pages in the victim block to a free block. During migration, the AMT 201 is updated accordingly. After the migration, the GC process can erase the candidate block and mark it as a free block.

To support time-varying properties, the controller 115 includes firmware modifications, including the addition of the IMT 213, the PRT 215, the Bloom filters 217, and the Delta buffers 219. As data versions are compressed, the IMT 213 is used to maintain the mapping of compressed invalid data versions, which can be used for translating an LPA to a PPA for compressed data pages. The PRT 215 can be a bitmap to indicate whether a flash page can be reclaimed during GC, e.g., a bit map of reclaimable pages of the memory device. The Bloom filters 217 can be used to identify whether an invalid page has expired or not. The Bloom filters 217 are also kept in time order to help maintain the temporal ordering across invalid data versions. The Delta buffers 219 group delta versions at page granularity in order to write the delta page back to the memory components 130. In addition, the controller 115 slightly extends the BST 205 to mark the blocks storing deltas, and extends the GMD 203 to locate the IMT 213 in the flash device.

To enable the time-travel properties of the memory sub-system 110, the GC procedure is modified to clean the expired and invalid pages. For the invalid pages, instead of reclaiming the free space immediately during the garbage collection (GC) process, the garbage collector 152 can reclaim invalid pages after the retention window has passed. The term "invalid" is to indicate when a page is deleted or updated but should still be retained. Once an invalid page has passed its retention time window (e.g., its timestamp is beyond such a time window), the invalid page becomes expired and can be reclaimed by GC. The expired data daemon 144 (or other expired data identifier) can be used during GC operations to decide whether a page has expired. In addition, the garbage collector 152 can include a compression engine to compress invalid pages in order to further save storage space.

As discussed, because SSDs (and other similar types of memory) make out-of-place updates, updating or deleting data invalidate their previous pages, which the memory subsystem 110 retains for a time window. Retaining invalid pages incurs both storage overhead and performance degradation. When the number of retained invalid pages increases, the percentage of free space decreases and GC is triggered more aggressively. For each GC operation, as the proportion of retained invalid page increases, more retained invalid pages would need to be migrated to new flash blocks. As a result, GC operations may take longer, and SSD performance can degrade since the memory sub-system 110 cannot respond to I/O requests during these operations. On the other hand, retaining as much invalid data as possible helps leverage the time-varying properties of data stored in the memory components 130. Therefore, there is a trade-off between retention duration and storage performance.

To ensure a certain level of storage performance, the memory controller 115 dynamically adjusts the retention duration, using GC overhead as a proxy for storage performance degradation. If the estimated GC overhead per write exceeds a given or predetermined threshold, the memory controller 115 reclaims some of the oldest invalid data. This reduces retention duration but improves access performance. A larger threshold results in lower access performance, but a longer retention duration. To fit with various workload patterns, the retention duration manager 142 can dynamically adjust the retention duration, in a workload-adaptive manner. For example, when workload writes become more intensive, the retention duration decreases accordingly.

However, the memory controller 115 can guarantee a lower bound for the retention duration in order to avoid malicious attacks. For example, a default minimum duration can be set at a certain number of days or hours, but this is configurable by memory vendors. For example, the default minimum duration could be set to two days, three days, four days, or the like. If the free storage space runs out and the retention duration has not reached the minimum number of days (or hours), the memory sub-system 110 can stop serving I/O requests, which may result in the failure of file system operations. The users or the administrator can quickly notice this abnormal behavior. Even in this extreme case, the memory sub-system 110 can preserve the past storage state of the last few days, for further analysis.

Identifying expired data versions for space reclamation makes GC operations possible, but is challenging. In order to judge whether an invalid page is expired or not, a naive approach would be to maintain a table that records the invalidation time of flash pages. Assuming an SSD of 1 TB capacity with 4 KB pages and each write timestamp occupies 4 bytes, this table will occupy 1 GB, which cannot be fully cached in the local memory 106 of the memory controller 115. Although it could be partially cached, like the address mapping table 201, cache misses would occur and introduce extra memory access overhead leading to reduced access performance.

Figure 3:
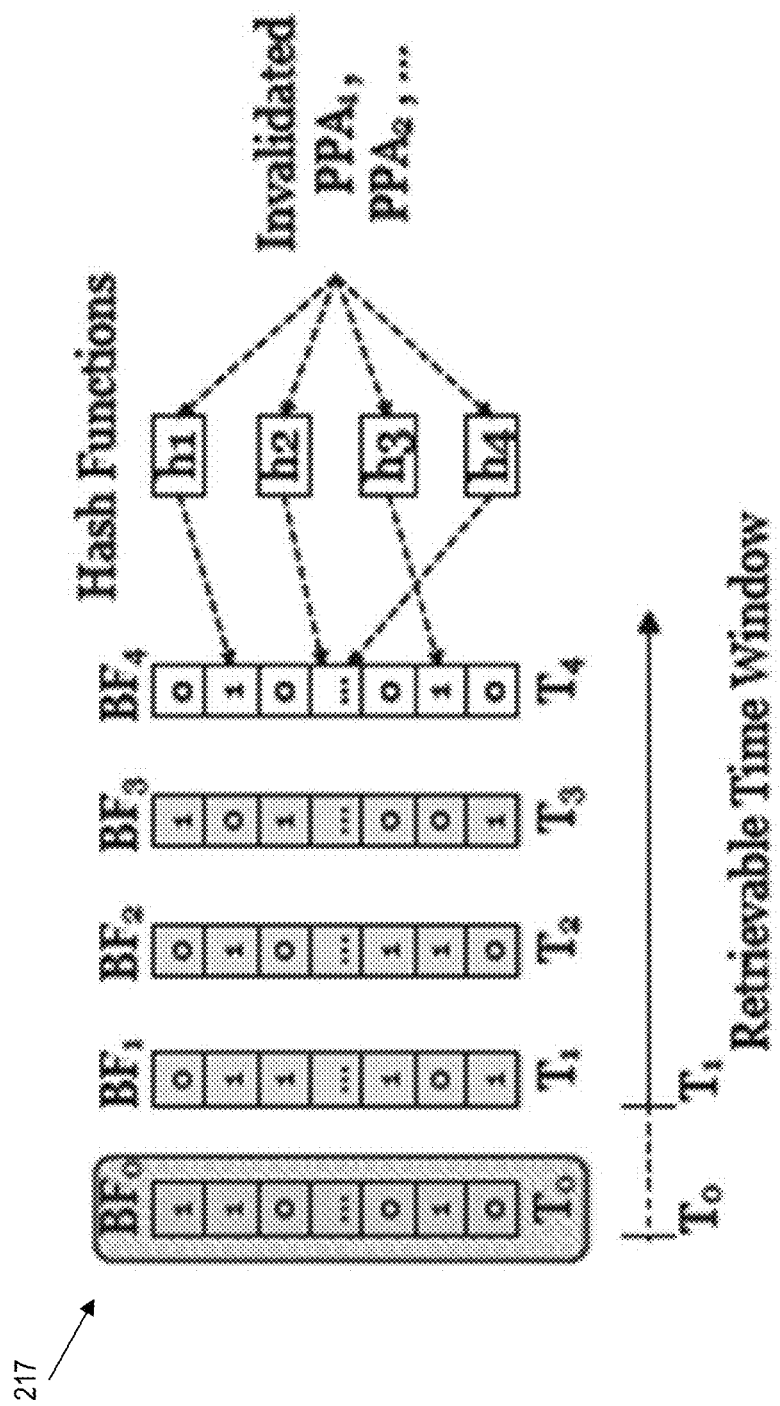
FIG. 3 is a block diagram of a retention time window and multiple bloom filters that record a fixed number of physical page addresses (PPAs) invalidated within a time segment according to an embodiment.

To solve this problem in a space-efficient manner, the memory sub-system 110 employs Bloom Filters (BFs) 217 to record the invalidation time of flash pages, as shown in FIG. 3. FIG. 3 is a block diagram of a retention time window and multiple bloom filters (BF) 217 that record a fixed number of physical page addresses (PPAs) invalidated within a time segment according to an embodiment. The retention window (or retrievable time window) goes from the creation time of the oldest BF to the present. For example, after $BF_0$ was deleted, the time window is shortened from $T_0$ to $T_1$ and thus data pages invalidated during $T_0$ and $T_1$ become expired.

Whenever a data page is invalidated, its physical page address (PPA) is added to the active BF, e.g., the most recently created BF. Once the number of PPAs in the current BF reaches a threshold, the active BF becomes inactive and a new active BF is created. Thus, each BF records a number of PPAs invalidated at approximately the same time, spanning from the BF's creation to its inactivation. Furthermore, the memory controller 115 may recycle BFs in the order of their creation. Thus, the retention window can be reduced simply by deleting the oldest BF. The retention window therefore starts from the creation time of the oldest BF to a present time.

By looking up the BFs, the garbage collector 152 can identify whether or not an invalid page has become expired. If the PPA was found in one of the BFs, the corresponding page is retained. False positives could happen, in which case an expired page is retained because it was found in an active BF. This does not cause incorrect behavior because, in contrast, there are no false negatives, e.g., no non-expired pages are recycled by mistake.

To reduce the number of BFs, the memory sub-system 110 can exploit spatial locality. Memory pages in a block can only be written sequentially, and sequential writes are likely to result in sequentially invalidated pages. The expired data daemon 144 can track invalidation at the granularity of a group, e.g., N consecutive pages in a memory block, where N is user configurable (e.g., 16, 32, 64 or the like in the disclosed design). This way, each BF 217 can accommodate more invalidated PPAs, and the number of BFs decreases. If any page in a group gets invalidated, the entire group is invalid in the BF 217. This will not cause incorrect behavior, because the GC algorithm can verify that a page is expired before erasing the page.

Content locality commonly exists between data versions mapped to the same logical page address (LPA). For example, only a small portion of bits (typically 5% to 20%), called delta bits, are changed in a page update. Compression engine 154 can exploit this property via use of delta compression to condense the invalid data versions. Delta compression computes the difference between two versions of the same page and represents the invalid version with a compressed delta derived from the difference, e.g., delta bits between the two pages. Such a compressed delta is usually much smaller than a page, allowing the compression engine 154 to save storage space for retained versions. When an invalid version is selected for compression, the latest data version mapped to the same LPA is taken as a reference. Since invalid versions are reclaimed in time order, a reference data version cannot be reclaimed before all the corresponding delta data versions. Delta compression brings at least two advantages. First, retention duration is increased because storage overhead is reduced. Second, the GC overhead is reduced, as fewer retained invalid pages need to be migrated during the GC procedure.

The compression engine 154 can perform delta compression during GC operations and idle I/O cycles. During a GC operation, invalid pages are compressed and migrated to new memory blocks. This could increase the GC overhead due to the extra compression operations. The increase in GC overhead could further degrade the SSD performance because no I/O operations can happen during GC.

To overcome this challenge, the compression engine 154 can exploit idle I/O cycles to perform background delta compression. As shown in prior studies, idle time between I/O requests commonly exists in real-world workloads. The memory controller 115 can predict the next delta compression file be reduced simply by deleting the oldest BF. The retention window therefore starts from the creation time of the oldest idle time length ($t_{predict}^{i}$) based on the last interval of time between I/O requests ($t_{interval}^{i-1}$) with $t_{predict}^{i} = \alpha * t_{interval}^{i-1} + (1-\alpha) * t_{predict}^{i}$), where $t_{predict}^{i}$ refers to the time length of the last prediction. The exponential smoothing method (with $\alpha=0.5$) can be used to predict idle time. Once the predicted idle time is greater than a threshold time period (10 milliseconds by default), the compression engine 154 can choose a victim memory block, delta compresses the invalid data pages, and marks the page that has been compressed or has expired as reclaimable in the page reclamation table (PRT) 215. Thus, future GC operations can directly reclaim these expired pages. When an I/O request arrives, the memory controller 115 can immediately suspend background compression operations in order to remove the overheads of retaining invalid data from the critical I/O path.

As a delta is usually much smaller than a page, the compression engine 154 can use the delta buffers 219 to coalesce deltas to page granularity. When a buffer is full, or the remaining space is not large enough to accommodate a new delta, the delta buffer is written to a delta block. Each BF is associated with dedicated delta blocks for storing deltas corresponding to the pages that were invalid in a time segment. Note that a compressed data page can hit multiple BFs, due to false positives. The memory controller 115 can check the BFs 217 in reverse time order (e.g., from the most recently created one to the oldest one). Once a hit occurs, the checking is stopped. This may delay the expiration of some data versions, but it avoids premature expiration.

The compression engine 154 can store deltas with different invalidation times separately for two reasons. The first is to maintain the reverse mapping for deltas which are mapped to the same LPA. Second is to improve the GC efficiency of cleaning expired data. When a BF is deleted to shorten the retention duration, the associated delta blocks contain all expired data versions and can therefore be erased immediately.

To achieve fast retrieval of previous data versions, the reverse index manager 146 can maintain a reverse index for each LPA, e.g., in a reverse index table. Each memory page has a reserved out-of-band (OOB) area for in-house metadata, where the OOB area for the page is physically stored with the page in memory component. The memory controller 115 can leverage this area to store metadata, including, but not limited to: (1) the LPA mapped to this flash page, (2) the previous PPA mapped to this LPA, called a back-pointer, and (3) the write timestamp of this page, which is to identify different data versions mapped to the identical LPA. The back-pointer is useable to construct the reverse mapping chain between different data versions for the identical LPA.

As discussed previously, some data versions are stored as deltas (e.g., delta blocks of data). Each delta contains at least the following metadata: (1) the LPA mapped to this delta, (2) the back-pointer, e.g., the PPA that contains the previous data version of this LPA, (3) the write timestamp of this data version, and (4) the write timestamp of the reference version of data (used to perform decompression). In a delta block, a page may contain multiple deltas. To retrieve these deltas, reverse index manage 146 can store a header in each delta page. The header can include at least: (1) the number of deltas in this delta page, (2) the byte offset of each delta, and (3) the metadata of all the deltas.

Figure 4A:
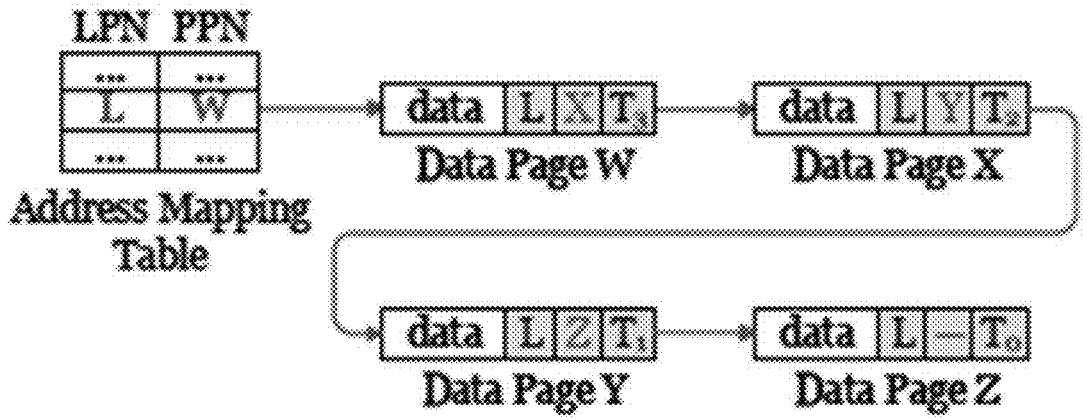
FIG. 4A is flow diagram of use of an address mapping table (for a logical page address (LPA)) to facilitate reverse data mapping chain before being broken by a garage collection operation according to an embodiment.
Figure 4B:
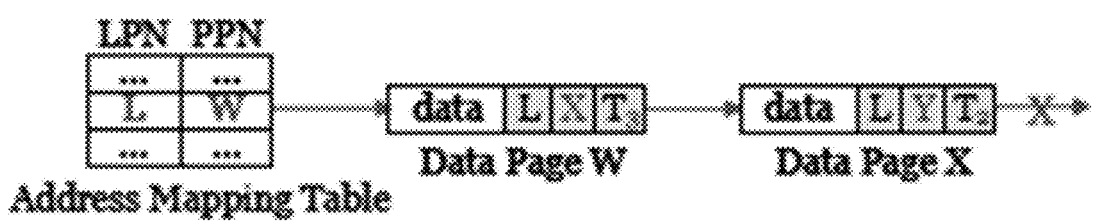
FIG. 4B is a flow diagram of use of the address mapping table after data page Y (FIG. 4A) is located and reclaimed according to an embodiment.
Figure 4C:
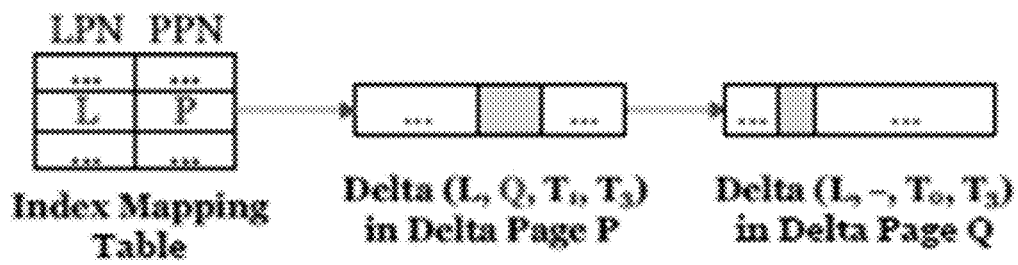
FIG. 4C is a flow diagram of use of an index mapping table, which includes mappings to compressed pages of data, after data page Y (FIG. 4A) is located and reclaimed according to an embodiment.

The reverse index manager 146 can build a reverse mapping chain with back-pointers between memory pages that store different data versions of an LPA. However, this index can be broken by GC operations. If GC happens to a page that is in the middle of the reverse mapping chain, the page data can be migrated to a new memory page. The chain will be broken since the previous back-pointer will no longer point to the correct page. To solve this problem, the reverse index manager 146 can divide the reverse mapping chain of an LPA into two parts: the data page chain and the delta page chain, as shown in FIGS. 4A-4C. Each data page contains OOB metadata: LPA, back-pointer, and write timestamp. Each delta contains metadata: LPA, back-pointer, the write timestamp of itself, and the reference data version. Note that '-' indicates a NULL pointer in FIGS. 4A and 4C.

FIG. 4A is flow diagram of use of an address mapping table (for an LPA) to facilitate reverse data mapping chain before being broken by a garage collection operation according to an embodiment. FIG. 4B is a flow diagram of use of the address mapping table after data page Y (FIG. 4A) is located and reclaimed according to an embodiment. FIG. 4C is a flow diagram of use of an index mapping table, which includes mappings to compressed pages of data, after data page Y (FIG. 4A) is located and reclaimed according to an embodiment. The data page chain contains uncompressed data versions that are newer than those (in compressed form) in the delta page chain. The PPA of the page for the header of each data page chain is recorded in the AMT 201, while the PPA of the page for the header of a delta page chain is recorded in the IMT 213.

The delta page chain is immune to GC operations because reclaiming delta blocks involves no delta migration. When the data pages chain of an LPA is broken by the garbage collector 152, the reverse index manager 146 can traverse the chain to find out all the unexpired versions up to the victim data page. For each page found, the OOB metadata can be used to verify that the reverse index manager 146 has the correct LPA and a decreasing timestamp value (e.g., write timestamps for respective unexpired versions of the pages have decreasing values). Then, the compression engine 154 can delta compress the pages found during traversal plus the GC victim into deltas (e.g., second deltas). When these second deltas are written to delta pages, the processing logic can further set (second) back-pointers for the second deltas to the second delta pages upon writing the second deltas to the delta page chain. In this way, the second back-pointers may be added to the header of the corresponding delta page chain. At the same time, the PPA of the page for the header of the delta page chain is updated in the IMT 213 for the target LPA. The data pages that were compressed are marked as reclaimable in the PRT 215. As a result, the data page chain and the delta page chain compose a complete reverse mapping chain for the LPA.

Figure 5:
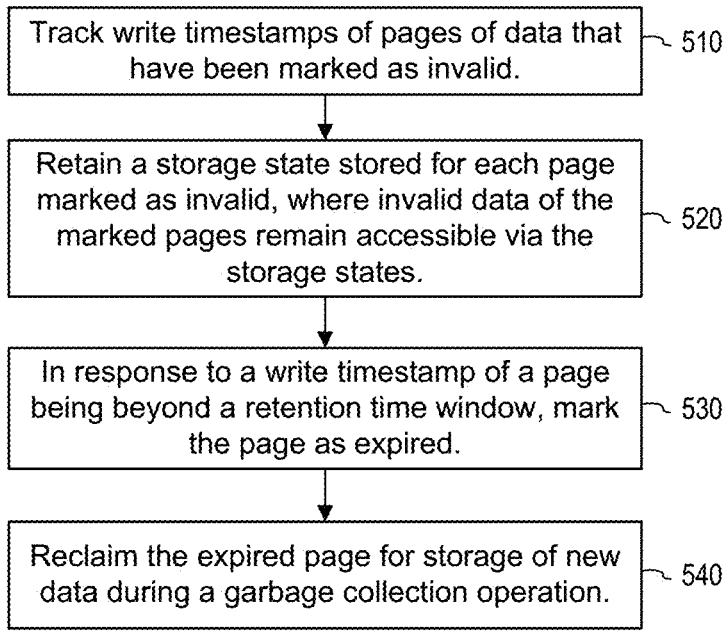
FIG. 5 is a flow chart of method for capturing time-varying storage of data in a memory device for data recovery purposes according to an embodiment.

FIG. 5 is a flow chart of method 500 for capturing time-varying storage of data in a memory device for data recovery purposes according to an embodiment. The method 500 may be performed by processing logic that may comprise hardware (e.g., circuitry, dedicated logic, programmable logic, microcode, etc.), software (such as instructions running on the processor), firmware or a combination thereof. In one embodiment, the memory controller 115 performs the method 500. For example, the embedded processor 102 may interface with the data structures stored in the local memory 106 to perform the method 500. In an alternative embodiment, the processing logic is within one of the flash controllers 120A, 120B, 120C . . . 120N.

At operation 510, the processing logic tracks write timestamps of pages of data that have been marked as invalid. The pages of data are located with a plurality of blocks of a memory device. The write timestamps may be tracked via the Bloom filters 217 (FIG. 3) once marked as invalid, as was previously discussed.

At operation 520, the processing logic retains a storage state stored for each page marked as invalid. Invalid data of the marked pages remains accessible via the storage states as was previously discussed. In some embodiments, the storage state may be at least partially included within metadata stored for the pages, e.g., to include a logical page address (LPA) mapped to the PPA and a back-pointer with a previous PPA to which the LPA was previously mapped, where the back-pointer is useable to construct a reverse mapping chain between different data versions for an identical LPA. The metadata may further include the write timestamp of the PPA, which is to identify different data versions mapped to the identical LPA.

At operation 530, in response to a write timestamp of a page being beyond a retention time window, the processing logic marks the page as expired, indicating that the page is an expired page. Expired pages may also be determined with reference to the Bloom filters 217.

At operation 540, the processing logic reclaims the expired page for storage of new data during a garbage collection operation. How the garbage collection operation functions within the context of time-varying storage will be discussed in more detail with reference to FIG. 8.

Figure 6:
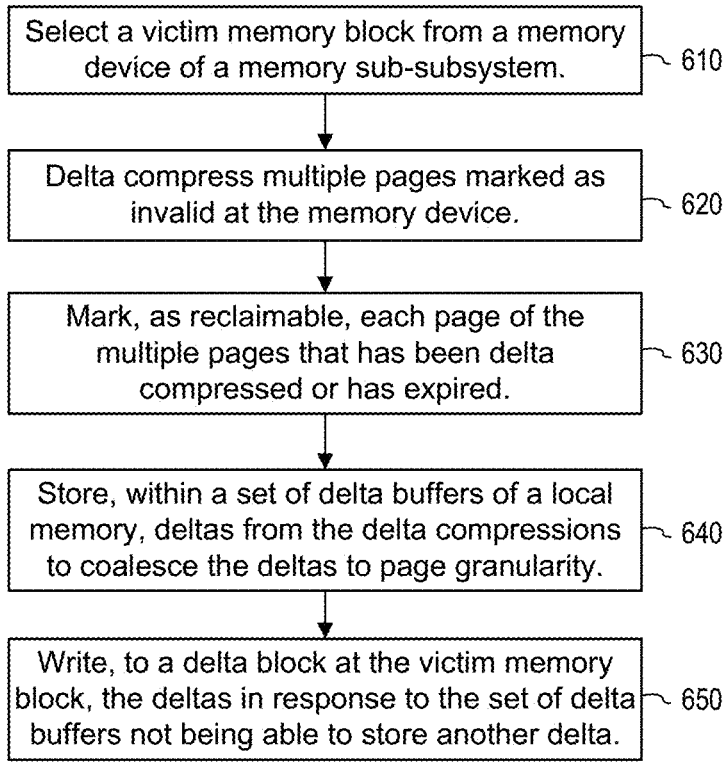
FIG. 6 is a flow chart of method for delta compressing and tracking deltas associated with historical updates to pages in memory for data recovery purposes according to an embodiment.

FIG. 6 is a flow chart of method 600 for delta compressing and tracking deltas associated with historical updates to pages in memory for data recovery purposes according to an embodiment. The method 600 may be performed by processing logic that may comprise hardware (e.g., circuitry, dedicated logic, programmable logic, microcode, etc.), software (such as instructions running on the processor), firmware or a combination thereof. In one embodiment, the memory controller 115 performs the method 600. For example, the embedded processor 102 may interface with the data structures stored in the local memory 106 to perform the method 600. In an alternative embodiment, the processing logic is within one of the flash controllers 120A, 120B, 120C . . . 120N.

At operation 610, the processing logic selects a victim memory block from a memory device of a memory subsubsystem. The victim memory block may be a block with the most invalid pages.

At operation 620, the processing logic delta compresses multiple pages marked as invalid at the memory device. Marking pages as invalid was discussed previously, including with reference to FIG. 5.

At operation 630, the processing logic marks, as reclaimable, each page of the multiple pages that has been delta compressed or has expired. These are pages that can be reclaimed in a garbage collection operation as will be discussed in more detail with reference to FIGS. 7-8.

At operation 640, the processing logic stores, within a set of delta buffers of a local memory, deltas from the delta compressions to coalesce the deltas to page granularity. At operation 650, the processing logic writes the deltas to a delta block at the victim memory block in response to the set of delta buffers not being able to store another delta. In this way, deltas are backed up to the memory device and accessible in order to perform data recovery on related pages if the need arises. The method 600 will be expanded upon in the below discussion with reference to FIG. 7.

FIG. 7 is a flow chart of psuedocode for firmware execution of a garbage collection operation by the memory controller according to an embodiment. Since the memory controller 115 is to retain invalid versions for each page, the GC algorithm shown in Algorithm 1 is different from conventional SSDs. Expired delta blocks are prioritized to be reclaimed, as no migration overhead is included. If no expired delta blocks are available, the data block that has the largest number of invalid pages is chosen by checking the BST 205. A page is reclaimable if the page is either an expired page whose PPA misses in all the BFs 217 or is an invalid page that is marked as reclaimable in the PRT 215. A page is not reclaimable if it is either a valid page or a retained page that needs to be compressed and then migrated during GC operations.

More specifically, Algorithm 1 begins at lines 1-3 with processing logic (e.g., of the firmware or other hardware or software logic) accessing the block status table 205 in response to detecting a command to perform garbage collection of pages organized into a plurality of blocks within one or more memory components. If the processing logic detects an expired delta block, then it erases the expired delta block.

Otherwise (Algorithm 1, line 4), if the processing logic does not detect an expired delta block, the processing logic (Algorithm 1, line 5) selects a victim data block that is a block with the greatest number of invalid pages. The processing logic may then identify (Algorithm, line 6) valid and invalid pages in the victim data block by checking the page validity table 207.

For each valid page, the processing logic (Algorithm 1, lines 7-9) can migrate the valid page to a free page within the one or more memory components. The processing logic then updates an entry in the index mapping table 213 that maps a logical page address of the valid page to a physical page address of the free page.

For each invalid page, the processing logic (Algorithm 1, lines 10-13) checks the page reclamation table 215 to determine whether the invalid page is reclaimable. If the invalid page is reclaimable, the processing logic discards the invalid page, e.g., because the invalid page has been compressed or has expired.

Otherwise, if the invalid page is reclaimable, the processing logic (Algorithm 1, lines 14-17) can determine whether the invalid page hits in the Bloom filters 217. If the pages misses the Bloom filters, then the processing logic discards the invalid page, as the invalid page has expired.

Otherwise, if the invalid page has not expired (hits in the Blooms filters) and is not reclaimable, the processing logic performs a number of operations as listed in Algorithm 1, lines 19-25. The processing logic can read the page and corresponding metadata stored with the page. The processing logic further reads older, unexpired data versions of the page and, specifically, reads a latest data version of the older, unexpired data versions. The processing logic compresses the older, unexpired data versions using, as a reference, the latest data version to generate a compressed data page. Specifically, the processing logic may delta compress verified unexpired versions of the data page.

The processing logic (Algorithm 1, lines 23-25) can further write back, to a delta pages chain of metadata stored with the page, delta blocks from a set of delta buffers that stored a delta version of the page. The processing logic can update a header of the delta pages chain stored with the delta blocks, where this header was discussed previously. The processing logic can also mark compressed data pages as reclaimable in the page reclamation table 215. In this way, the marked pages that are expired can be erased from the victim data block.

Besides performing GC operations, the garbage collector 152 monitors and periodically estimates the GC overhead per user page write. The GC cost can be quantified by tracking the number of page reads ($N_{read}$), page writes ($N_{write}$), block erases ($N_{erase}$), and delta compressions ($N_{delta}$) in each period. A period refers to the time during which a fixed number of page writes ($N_{fixed}$) are issued.

$$\frac{N_{read} * C_{read} + N_{write} * C_{write} + N_{erase} * C_{erase} + N_{delta} * C_{delta}}{N_{fixed}} > \quad (1)$$
$$TH * C_{write}$$

It is assumed that the operation costs (in units of time) of a page read, a page write, a block erase, and a delta compression are $C_{read}$, $C_{write}$, $C_{erase}$, and $C_{delta}$ respectively. The left side of Equation 1 can be used as an the estimation of the average GC overhead. This overhead measurement is then used to adjust the retention time window. Specifically, once the average GC overhead exceeds a predetermined threshold (TH), e.g., 20% of the cost of a page write by default (the right side in Equation 1), the retention time window is shortened.

The garbage collector 152 can erase memory blocks with the largest number of invalid pages, so wear imbalance occurs when flash pages are not evenly updated. To balance the wear between memory blocks, wear leveling swaps cold data (e.g., rarely updated data) to old blocks (e.g., blocks that undergo more erases). The memory controller 115 can employ such a swapping technique for data blocks and handles the migration of retained invalid data pages in victim blocks like in GC operations. Delta blocks are not considered, because the memory controller 115 is to prevent the delta pages chain from being broken. The modification to the wear-leveling mechanism has little impact on its effectiveness for two reasons. First, delta blocks are erased in the time order, so the wear imbalance between them is avoided. Second, the allocations of delta blocks and data blocks share the same free block pool, where wear balance can be achieved by the wear leveling of data blocks over time.

Figure 8:
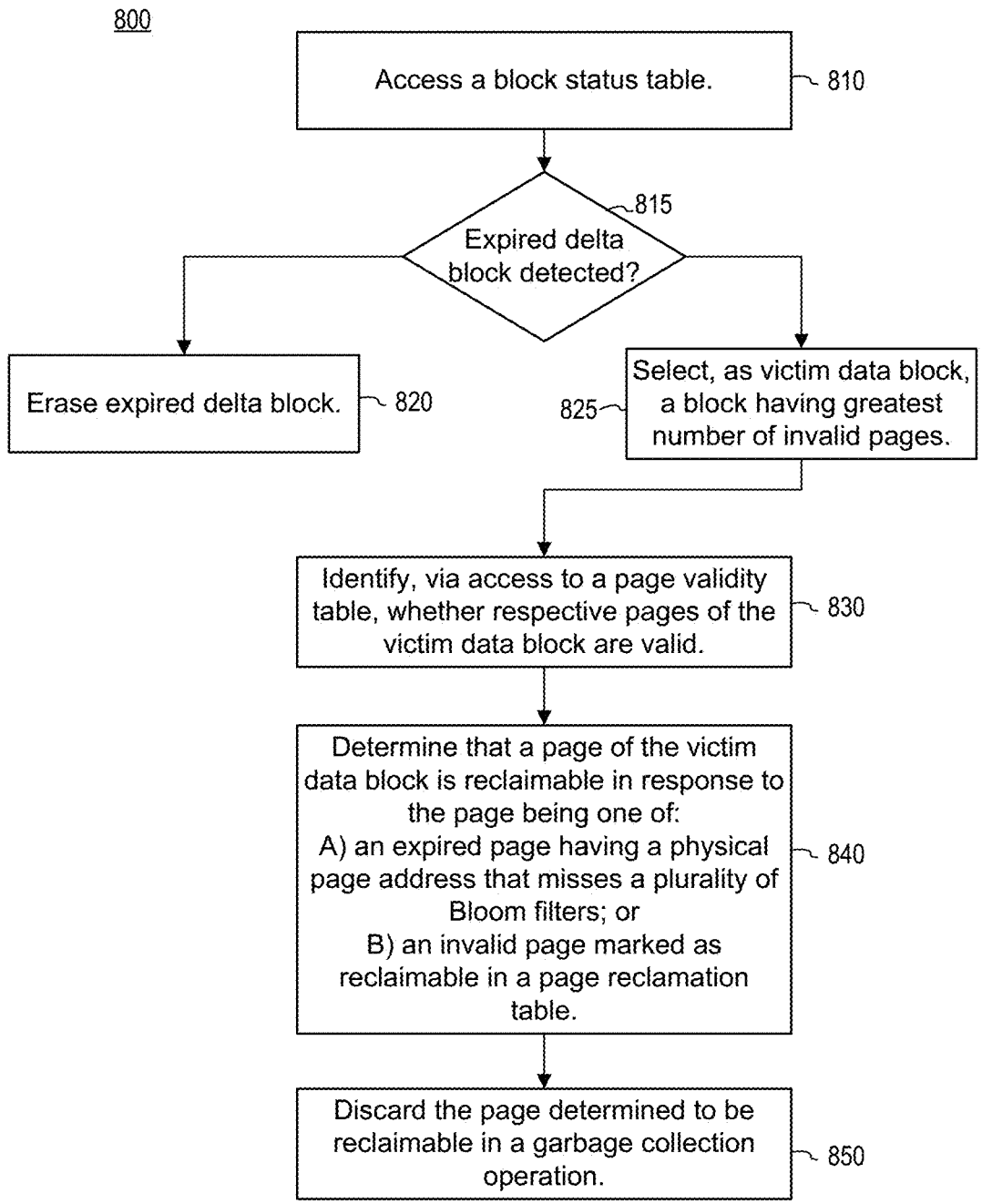
FIG. 8 is a flow chart for a method of performing garbage collection where invalid pages are retained and their statuses tracked within out of bound (OOB) metadata according to some embodiments.

FIG. 8 is a flow chart for a method 800 of performing garbage collection where invalid pages are retained and their statuses tracked within OOB metadata according to some embodiments. The method 800 may be performed by processing logic that may comprise hardware (e.g., circuitry, dedicated logic, programmable logic, microcode, etc.), software (such as instructions running on the processor), firmware or a combination thereof. In one embodiment, the memory controller 115 performs the method 800. For example, the embedded processor 102 may interface with the data structures stored in the local memory 106 to perform the method 800. In an alternative embodiment, the processing logic is within one of the flash controllers 120A, 120B, 120C . . . 120N.

At operation 810, the processing logic accesses a block status table, e.g., in response to detecting a command to perform garbage collection of pages organized into a plurality of blocks within one or more memory components.

At operation 815, the processing logic determines whether there is an expired delta block detected via the access to the block status table. If an expired delta block is detected, the processing logic, at operation 820, erases the expired delta block.

At operation 825, the processing logic, in response to not detecting an expired delta block indexed within the block status table, selects a victim data block that is a block, of the plurality of blocks, with a greatest number of invalid pages.

At operation 830, the processing logic identifies, via access to a page validity table, whether respective pages of the victim data block are valid.

At operation 840, the processing logic determines that a page of the victim data block is reclaimable in response to the page being one of: A) an expired page having a physical page address that misses a plurality of Bloom filters, wherein the plurality of Bloom filters record physical page addresses for pages invalidated during a time segment and are indexed chronologically over time; or B) an invalid page marked as reclaimable in a page reclamation table. Additionally, or in the alternatively, the processing logic determines that the page of the victim data block is not reclaimable in response to determining that the page is one of valid or is a retained page that is to be compressed and then migrated during the garbage collection operation.

At operation 850, the processing logic discards the page determined to be reclaimable in a garbage collection operation.

In various embodiments, to enable the exploitation of the time-varying properties provided by the memory sub-system 110, the software interface 119 has been developed for both state queries and recoveries. The basic functionalities/APIs can be classified into three categories, as shown in Table 1.

TABLE 1

The API for Storage-State Query in TimeKits.

| API | Explanation |
| --- | --- |
| AddrQuery(addr, cnt, t) | Get the first data version(s) written since some time ago (specificed by t) for a single LPA (cnt = 1) or a range of LPAs (cnt > 1) started at addr. |
| AddrQueryRange (addr, cnt, t1, t2) | Get all the data versions written in a time period (between t1 and t2) for a single LPA (cnt = 1) or a range of LPAs (cnt > 1) started at addr. |
| TimeQueryAll(addr, cnt) | Get all the retained data versions for a single LPA (cnt = 1) or a range of LPAs (cnt > 1) started at addr. |

TABLE 1-continued

The API for Storage-State Query in TimeKits.

| API | Explanation |
|---|---|
| TimeQuery(t) | Get all the LPAs that has been updated since some time ago (specified by t) and their writing timestamps. |
| TimeQueryRange(t1, t2) | Get all the LPAs that has been updated within a time period (between t1 and t2) and their writing timestamps. |
| TimeQueryAll( ) | Get all the LPAs that has been updated within the entire retention window and their writing timestamps. |
| RollBack(addr, cnt, t) | Roll back to the first data version(s) written some time ago (specified by t) for a single LPA (cnt = 1) or a range of LPAs (cnt > 1) started at addr. |
| RollBackAll(t) | Roll back to the first data versions written some time ago (specified by t) for all the valid LPAs. |

Address-based state queries. Given a single LPA or a range of LPAs, the software interface 119 can utilize the reverse index (generated by the reverse index manager 146) to quickly retrieve any invalid data version within the retention window for each LPA. The software interface 119 provides three APIs for such state queries. AddrQuery can get the first data version(s) written since some time ago for a single LPA or a range of LPAs. For each LPA, we traverse the reverse index and retrieve each data version, one by one, beginning from the latest version. Each data version's writing time is checked, and the retrieval stops when a version's writing time reaches the target time, or the tail of the index is reached. On contrast, AddrQueryRange or AddrQueryAll is used to get all the data versions within a given time period or the entire retention window, respectively. Address-based state queries are useful to retrieve the invalid versions of a given file, whose LPAs can be obtained from the file-system metadata.

Time-based state queries. The software interface 119 supports three kinds of time-based state queries, which return the write history of LPAs over time. TimeQuery can get the all the LPAs that have been updated since some time, and their writing timestamps (an updated LPA may have multiple writing timestamps). TimeQueryRange or TimeQueryAll perform such queries within a given time period, or the entire retention window, respectively. These queries are similar to address-based state queries except that all the valid LPAs are checked. To improve query performance, the software interface 119 leverages the parallelism of SSDs (other such similar memory) to maximize read throughput. Time-based state queries are useful for storage forensics.

State rollbacks. Besides state queries, the software interface 119 can roll back storage states to undo changes. RollBack reverts an LPA or a range of LPAs to a previous version. For each LPA, this is achieved by (1) retrieving a specified previous version through AddrQuery, (2) writing back this data version like an update to the LPA, and (3) invalidating the latest data version and modifying the address mapping entry. This way a state rollback is just a regular write with a previous data version. Future accesses will return the previous version, while all previous versions still remains recoverable. This API enables a lightweight rollback for a given LPA. RollBackALL rolls back all the valid LPAs to a previous version, is also supported. However, rolling back a large amount of LPAs is aggressive and causes a large volume of writes. This could significantly shorten the retention duration, or even cause failures due to the violation of the 3-day retaining guarantee for invalid data.

These state query APIs provide flexibility, and enable developers to efficiently and securely defend against encryption ransomware, recover data, and perform storage forensics. Previous file systems, such as Ext4 and XFS, write metadata changes to a journal, and rely on the journal to recover the LPAs. If the LPAs have been overwritten or the relevant journal records have been erased for space reclamation, these tools will fail to recover the target file. The file recovery tools of the software interface 119 can exploit the time-varying properties of the memory sub-system 110. The tool can, either retrieve erased journal records and invalid versions via address-based state queries, obtain the LPAs from the file system superblock and inode table, or restore the storage device to a previous state, via the state rollback functions discussed above.

Consider the increasing density and decreasing cost of flash memory (e.g., the pricing of today's SSDs is about $0.20/GB). This allows us to add more flash chips into future devices to retain more storage states for a longer period of time. Retaining past storage states can prevent the secure deletion of sensitive data from the flash medium or other similar memory. However, it is feasible to protect sensitive data from leakage in the memory sub-system 110. The memory controller 115 can use a user-specified encryption key to encrypt invalid data. This data can still be recovered by users, but cannot be retrieved by others without the encryption key.

A malicious attacker may initiate attacks dedicated to the memory subs-system 110. For example, attackers might intensively write and delete junk files. However, it is noted that a deleted file is not physically deleted in the memory (e.g., SSD) until it is garbage collected. Therefore, the memory will quickly become full, and the memory sub-system can stop accepting I/O requests. This can be easily observed by end users.

Alternatively, an attacker might slowly write junk data. In this case, the retention duration of memory sub-system 110 can increase accordingly since the workload is less write intensive. As shown in FIGS. 8A-8B, the retention duration can increase to up to 56 days. Many ransomware variants aim to lock up user data and collect ransom quickly to prevent from being caught. The disclosed memory sub-system 110 can significantly increase the risk of getting caught and can thus thwart malicious attackers from attacking our system.

As discussed previously, malicious users would also exploit the data recovery procedure of the software interface 119 to destroy the retained invalid data. Since the software interface 119 recovers user data by writing the invalid versions back to the memory (e.g., SSD), the recent data versions could still be retained in the memory. Moreover, the memory sub-system 110 can retain the invalid data versions within a time window guarantee, even though malicious users keep writing junk data to the SSD. Therefore, the memory sub-system is still be able to recover the recent storage states. To defend this attack, another simple approach is that users can remove the SSD and plug it into another trusted computer for data recovery.

The memory sub-system 110, for purposes of experimentation, was implemented on a Cosmos+OpenSSD FPGA development board running the NVM Express (NVMe) protocol. This board has a programmable ARM Cortex-A9 Dual-core and 1 GB or DRAM. The SSD has a 1 TB capacity and an additional 15% of the capacity as overprovisioning space. Each flash page is 4 KB with 12 bytes of OOB metadata, and each block has 256 pages. Besides basic I/O commands to issue read and write requests, we define new NVMe commands to wrap the APIs (shown in Table 1). The software interface 119 was developed atop the host NVMe driver, which issues NVMe commands to the firmware running on the OpenSSD board. Inside the memory sub-system 110, the NVMe command interpreter was slightly modified and the state query engine 160 was added into the firmware 112 for state query execution. An amount of 64 MB of memory was reserved in the firmware 112 for the Bloom Filters and for the delta compression buffer. Implementing these functions adds 10,537 lines of code to the OpenSSD stack. The memory sub-system 110 adopts the page-level address translation. Delta compression was implemented with the LZF algorithm because of its high speed.

In our evaluation, we demonstrate that (1) the memory sub-system 110 has minimal negative impact on storage performance and SSD lifetime for data-intensive applications. (2) It performs better than software-based approaches such as journaling and log-structured file systems, while providing firmware-isolated time-travel features. (3) The software interface 119 performs fast storage-state queries for different systems functions. (4) Two case studies to show that the memory sub-system 110 can restore user data to defend against encryption ransomware, and can provide data reverting for applications with low performance overhead.

TABLE 2

The Workloads Used in Our Evaluation.

| Name | Description |
| --- | --- |
| MSR [25] | The storage traces collected from enterprise servers. |
| FIU [9] | The storage traces collected from computers at FIU. |
| IOzone [16] | A benchmark for generating various file operations. |
| PostMark [17] | A file system benchmark that emuates mail servers. |
| OLTP [36] | An open-source database engine Shore-MT. |

To evaluate the benefits of the firmware-isolated time-varying properties, we compare the disclosed memory sub-system 110 with a regular SSD. We use a variety of real-world storage traces, file system benchmarks, and data-intensive workloads, as shown in Table 2: (1) A set of week-long storage traces collected on enterprise servers running different applications, such as a media server, a research project management system, and a print server at Microsoft Research Cambridge. (2) A set of storage traces for twenty days, collected on department computers at FIU. (3) The IOZone benchmark, which generates a variety of file operations. (4) The PostMark benchmark, which generates a workload approximating a mail server. (5) An open-source database engine, Shore-MT, running with a variety of transaction benchmarks, such as TPCC, TPCB, and TATP. The machine connected to the programmable SSD has a 24-core Intel Haswell based Xeon CPU, running at 2.6 GHz, with 32 GB of DRAM. Before each experiment, we run variants of the file system benchmarks to warm up the SSD and to ensure GC operations are triggered.

We first evaluate the impact of the disclosed memory sub-system 110 on storage performance, device lifetime, and data retention duration, with model-specific register (MSR) storage traces. In order to evaluate the device-level time-varying properties for a long period of time, we prolong each MSR trace to one month by duplicating it ten times. In each duplication, we mutate the trace by shifting the logical addresses of the I/O requests by a random offset. As reported, the delta compression ratio values follow a Gaussian distribution and the average ratio ranges from 0.05 to 0.25 for real-world applications. Since the MSR and FIU traces do not contain real data content, we use 0.2 as the default compression ratio for the experiments. To understand the impact of storage capacity usage, we vary the utilization of the device from 50% to 80% of the total storage capacity of the SSD.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. A memory device comprising:
one or more memory components comprising a plurality of blocks, the plurality of blocks containing pages of data; and
a processing device coupled to the one or more memory components, the processing device to execute firmware to:
track write timestamps of pages of data that have been marked as invalid;
retain a storage state stored for each page marked as invalid, wherein invalid data of the marked pages remain accessible via the storage states;
in response to a write timestamp of a page being beyond a retention time window, mark the page as expired, indicating that the page is an expired page; and
reclaim the expired page for storage of new data during a garbage collection operation.

2. The memory device of claim 1, wherein the processing device is further to execute the firmware to store metadata with a first page, identified by a physical page address (PPA), wherein the metadata comprises:
a logical page address (LPA) mapped to the PPA;
a back-pointer comprising a previous PPA to which the LPA was previously mapped, wherein the back-pointer is useable to construct a reverse mapping chain between different data versions for an identical LPA; and
a write timestamp of the PPA, which is to identify different data versions mapped to the identical LPA.

3. The memory device of claim 2, wherein, before reclaiming the expired page and in response to a request to restore the first page, the processing device is further to:
access the metadata of the first page to determine the PPA of the first page at a time for which invalid data of the first page is to be restored; and
write the invalid data of the first page to a free block of the one or more memory components.

4. The memory device of claim 1, wherein the one or more memory components are solid-state drive (SSD) memory components, and wherein the pages of data include metadata comprising invalid state markers, each invalid state marker to track whether a page is invalid and should still be retained in the one or more memory components.

5. The memory device of claim 1, wherein the firmware includes a garbage collector, which when executed by the processing device, is to:
estimate an overhead of the garbage collection operation per page write; and
in response to the overhead exceeding a predetermined threshold, shorten the retention time window.

6. The memory device of claim 5, wherein, to estimate the overhead of the garbage collection operation, the processing device is further to determine a combination of a number of page reads, page writes, block erases, and delta compressions performed in each period, where each period is a time during which a fixed number of page writes are issued.

7. The memory device of claim 1, wherein the firmware comprises a compression engine, which when executed by the processing device, is to:
compress the marked pages to generate compressed data; and
store the compressed data in the one or more memory components.

8. The memory device of claim 1, wherein the firmware comprises a reverse index manager, which when executed by the processing device, is to maintain a reverse chronological mapping of invalid data versions of the marked pages.

9. A system comprising:
one or more memory components comprising a plurality of blocks, the plurality of blocks containing pages of data;
a local memory coupled to the one or more memory components; and
a processing device coupled to the one or more memory components and to the local memory, the processing device to execute firmware to:
track write timestamps of pages of data that have been marked as invalid;
retain a storage state stored for each page marked as invalid, wherein invalid data of the marked pages remain accessible via the storage states;
store, in the local memory, one or more data structures to track the storage states for the marked pages over time;
in response to a write timestamp of a page being beyond a retention time window, mark the page as expired, indicating that the page is an expired page; and
reclaim the expired page for storage of new data during a garbage collection operation.

10. The system of claim 9, wherein the one or more data structures comprises an index mapping table to maintain a mapping between logical page addresses and physical page addresses of invalid data versions of the pages within the one or more memory components.

11. The system of claim 9, wherein the one or more data structures comprises a page reclamation table, which includes a bitmap that indicates whether a page can be reclaimed during the garbage collection operation.

12. The system of claim 9, wherein the one or more data structures comprises multiple Bloom filters that are to record a fixed number of physical page addresses for pages invalidated during a time segment and are indexed chronologically over time, wherein the firmware further comprises a garbage collector, which when executed by the processing device, is to access the multiple Bloom filters to determine whether an invalid page is expired.

13. The system of claim 12, wherein the processing device is further to recycle respective ones of the multiple Bloom filters in order of creation.

14. The system of claim 9, wherein the one or more data structures comprise:
multiple delta buffers, which group delta updates to the pages of data at a page granularity in order to write delta pages back to the one or more memory components in response to a restore operation; and
a block status table to mark the blocks, of the plurality of blocks, that are associated with the delta pages indexed within the multiple delta buffers.

15. A method comprising:
selecting, by a processing device executing firmware of a memory sub-system, a victim memory block from a memory device of a memory sub-subsystem;
delta compressing, by the processing device to generate delta compressions, multiple pages of the victim memory block marked as invalid at the memory device;
marking, by the processing device as reclaimable, each page of the multiple pages that has been delta compressed or has expired;
storing, by the processing device within a set of delta buffers of a local memory, deltas from the delta compressions to coalesce the deltas to page granularity; and
writing, by the processing device to a delta block at the victim memory block, the deltas in response to the set of delta buffers not being able to store another delta.

16. The method of claim 15, further comprising:
predicting, by the processing device, idle time between input/output (I/O) requests of the memory device; and
determining, by the processing device, that the idle time is greater than a threshold time period before performing the delta compressing.

17. The method of claim 15, further comprising recording, in relation to a physical block address for the delta block, a bitmap of reclaimable pages in a page reclamation table in the local memory.

18. The method of claim 15, further comprising:
associating a Bloom filter, stored in the local memory, with the delta block; and
tracking, by the Bloom filter, a period of time since invalidation of the multiple pages.

19. The method of claim 15, further comprising maintaining, by the processing device in a reverse index table of the local memory, a reverse index that maps logical page addresses for each page of the multiple pages to physical page addresses of previous data versions that include the deltas.

20. The method of claim 15, further comprising storing, with a delta of the deltas, metadata comprising one or more of:
a logical page address of a first page, of the multiple pages, mapped to the delta;
a back-pointer comprising a physical page address that contains a previous data version of the logical page address;
a write timestamp of a version of data associated with the delta; or
a write timestamp of the first page to which the delta is mapped.

21. The method of claim 20, further comprising:
storing a header with a delta page that includes the delta for the first page, the header comprising a number of deltas associated with the first page, a byte offset of each delta of the number of deltas, and the metadata for the deltas;

arranging data versions of the first page into a data page chain;

recording a second physical page address of the data page chain in an address mapping table;

arranging delta versions of the first page into a delta page chain; and recording a third physical address of the delta page chain in an index mapping table.

22. The method of claim 21, further comprising:

detecting that a first data version of the first page is removed as a victim data page;

traverse, with reference to the address mapping table, the data page chain to determine unexpired versions of the first page;

verifying, with reference to second metadata stored with the unexpired versions, a logical page address associated with each of the unexpired versions of the first page and that write timestamps for respective unexpired versions have decreasing values;

delta compressing verified unexpired versions of the first page and the first page itself to generate second deltas;

writing the second deltas to second delta pages; and setting back-pointers for the second deltas to the second delta pages upon writing the second deltas to the delta page chain.

23. A method comprising:

accessing, by a processing device, a block status table in response to detecting a command to perform garbage collection of pages organized into a plurality of blocks within one or more memory components;

in response to not detecting an expired delta block indexed within the block status table, selecting a victim data block comprising a block, of the plurality of blocks, with a greatest number of invalid pages;

identifying, by the processing device accessing a page validity table, whether respective pages of the victim data block are valid;

determining, by the processing device, that a first page of the victim data block is reclaimable in response to the first page being one of:

an expired page having a physical page address that misses a plurality of Bloom filters, wherein the plurality of Bloom filters record physical page addresses for pages invalidated during a time segment and are indexed chronologically over time; or an invalid page marked as reclaimable in a page reclamation table; and discarding, by the processing device, the first page determined to be reclaimable in a garbage collection operation.

24. The method of claim 23, further comprising, in response to detecting an expired delta block indexed within the block status table, erasing the expired delta block.

25. The method of claim 23, further comprising, for each page within the victim data block determined to be a valid page:

migrating the valid page to a free page within the one or more memory components; and updating an entry in an index mapping table that maps a logical page address of the valid page to a physical page address of the free page.

26. The method of claim 23, further comprising determining that the first page of the victim data block is not reclaimable in response to determining that the first page is one of valid or is a retained page that is to be compressed and then migrated during the garbage collection operation.

27. The method of claim 23, further comprising, in response to the first page hitting in one of the plurality of Bloom filters or not being reclaimable:

reading the first page and corresponding metadata stored with the first page;

reading older, unexpired data versions of the first page;

reading a latest data version of the older, unexpired data versions of the first page; and compressing the older, unexpired data versions of the first page using, as a reference, the latest data version to generate a compressed data page.

28. The method of claim 23, further comprising, in response to the first page hitting in one of the plurality of Bloom filters or not being reclaimable:

writing back, to a delta pages chain of metadata stored with the first page, delta blocks from a set of delta buffers that stores a delta version of the first page;

updating a header of the delta pages chain stored with the delta blocks; and marking compressed data pages as reclaimable in the page reclamation table.

29. The method of claim 28, wherein the header comprises:

a number of deltas in the delta version of the first page;

a byte offset of each delta of the number of deltas; and metadata associated with each delta of the number of deltas.

* * * * *